(12) United States Patent
Garrett et al.

(10) Patent No.: US 7,797,605 B2
(45) Date of Patent: Sep. 14, 2010

(54) MANAGING STORAGE OF HARQ PACKETS

(75) Inventors: David Garrett, Santa Clara, CA (US);
Brett Schein, Santa Clara, CA (US);
Trevor Pearman, Santa Clara, CA (US)

(73) Assignee: Beceem Communications Inc., Santa Clara, CA (US)

( * ) Notice: Subject to any disclaimer, the term of this patent is extended or adjusted under 35 U.S.C. 154(b) by 655 days.

(21) Appl. No.: 11/895,935

(22) Filed: Aug. 28, 2007

(65) Prior Publication Data

US 2009/0059801 A1 Mar. 5, 2009

(51) Int. Cl.
*G08C 25/02* (2006.01)

(52) U.S. Cl. .................. 714/748; 714/779

(58) Field of Classification Search .......... 714/779, 714/748

See application file for complete search history.

(56) References Cited

U.S. PATENT DOCUMENTS

| | | | | |
|---|---|---|---|---|
| 5,271,012 A * | 12/1993 | Blaum et al. | | 714/6 |
| 6,023,783 A * | 2/2000 | Divsalar et al. | | 714/792 |
| 7,502,981 B2 * | 3/2009 | Cai et al. | | 714/748 |
| 7,539,207 B2 * | 5/2009 | Frederiksen et al. | | 370/465 |
| 7,631,239 B2 * | 12/2009 | Yeo et al. | | 714/748 |
| 2003/0147474 A1 * | 8/2003 | Ha et al. | | 375/295 |
| 2005/0050427 A1 * | 3/2005 | Jeong et al. | | 714/755 |
| 2005/0185608 A1 | 8/2005 | Lee et al. | | |
| 2005/0204251 A1 * | 9/2005 | Moon et al. | | 714/748 |
| 2006/0072496 A1 | 4/2006 | Nakamata et al. | | |
| 2006/0209783 A1 * | 9/2006 | Jain et al. | | 370/349 |
| 2007/0124640 A1 * | 5/2007 | Suh et al. | | 714/748 |
| 2007/0250751 A1 * | 10/2007 | Cai et al. | | 714/748 |
| 2008/0022178 A1 * | 1/2008 | Kim et al. | | 714/748 |
| 2008/0043703 A1 * | 2/2008 | Choi et al. | | 370/342 |

* cited by examiner

*Primary Examiner*—M. Mujtaba K Chaudry
(74) *Attorney, Agent, or Firm*—Brian R. Short

(57) ABSTRACT

Methods of managing storage of HARQ packets are disclosed. One method includes a wireless device receiving variable length HARQ packets. The wireless device performing an error check on each received variable length HARQ packet, and storing within HARQ memory the HARQ packets that fail the error check. Each failed HARQ packet is stored in the HARQ memory by dividing the HARQ packet into HARQ sub-packets, and storing each HARQ sub-packet. The storage locations and storage order of each of the HARQ sub-packets are recorded for future retrieval.

10 Claims, 6 Drawing Sheets

MANAGING STORAGE OF HARQ PACKETS

FIELD OF THE DESCRIBED EMBODIMENTS

The invention relates generally to wireless communications. More particularly, the invention relates to managing storage of HARQ packets.

BACKGROUND OF THE INVENTION

Transmission of data packets over wired and wireless links needs to be fast and reliable. Speed requirements are set by seemingly ever-increasing data transfer rates, and quality of service requirements are set by increasing system needs for accuracy in transmissions.

Digital data transmissions over wired and wireless links sometimes may be corrupted, for instance, by noise in the link or channel, by interference from other transmissions (e.g., radio), or by environmental factors related to, for example, the speed, direction, location and requests between transmitting and receiving units. Even with clear communication channels (i.e., channels with limited corruption), which lend themselves to the high data rates, it may not be possible to appropriately decode the data stream with the requisite error rates. Digital data transmissions may also be limited by an inability of the receiving or transmitting equipment to appropriately encode and decode the data stream at the speeds desired with the requisite error rates.

It may be infeasible to provide hardware suitable for high rate data transmission at a cost and portability demanded by the application. Requested services may range from voice communications over high-speed Internet connections to video conferencing. The hardware at the receiver end should be light and small, and use minimal amounts of power. Similarly, digital signal processing hardware for accurate conveyance of data packets should be compact and consume low power. Portability restrictions may require that all system attributes be well designed, using a minimal amount of integrated circuits, electronic components, batteries, and other components.

Error detection and correction codes typically provide mechanisms necessary to reliably receive and decode data packets. Forward error correction (FEC) codes allow decoders to accurately reconstruct data packets received with possible errors at the expense of some additional overhead (e.g., extra parity bits, extra symbols). Forward error protection may protect a data packet. With FEC, the protected data packet is generally "self-decoding" in that all the data (information) required to reconstruct the data packet is within a single receive block. Stored data may rely on FEC for reliable extraction.

In two-way systems, an opportunity for requesting that a data packet be retransmitted upon detection of an error may be available. An automatic repeat request (ARQ) may be sent upon detection of an error using, for example, a parity bit check or a cyclic redundancy check (CRC), and then the original data packet may be discarded. Upon receipt of an ARQ request, the packet may simply be retransmitted in its original form.

This simple combination of ARQ and FEC is sometimes called Type I hybrid ARQ, and the term "hybrid ARQ" is usually reserved for a more complex procedure where a receiver may combine previously received erroneous packets with a newly received packet in an effort to successfully ascertain the contents of the packet. The general procedure in a hybrid automatic repeat request (HARQ) system is that a receiver may generate an indicator, such as an ARQ request, upon detection of an error in the received data packet. Unlike Type I ARQ, the receiver does not discard previously received erroneous packets. The receiver may keep (that is, store) the entire or portions of the erroneous packet because the erroneous packet may still contain worthwhile information, and therefore is not discarded when using HARQ. By combining erroneous packets, the receiver may be able to assist the FEC to correct the errors. The receiver may require, however, an abundance of volatile memory for storing previous data packets and provisioning for the needs of the HARQ decoder. A HARQ buffer may contain a large amount of memory designated for just this purpose. Large memory requirements, particularly in portable, mobile equipment, may require excessively large space and consume an excessively large amount of power. A method for decreasing the amount of memory required for a HARQ system is therefore desirable. Methods for managing and optimizing volatile memory available in a communication system are also desirable. The method should be compatible with any ARQ protocol, such as selective-repeat or multi-channel stop-and-wait, and capable of being used with all underlying types of HARQ.

It is desirable to have a system and method of efficiently storing HARQ data packets. It is desirable that the system and method allow for storage of the HARQ data packets in more compact, less-power consuming memory that is presently available.

SUMMARY OF THE INVENTION

An embodiment includes a method of managing storage of HARQ packets. The method includes a wireless device receiving variable length HARQ packets. The wireless device performs an error check on each received variable length HARQ packet, and stores the HARQ packets in HARQ memory. The HARQ packets are stored in the HARQ memory by dividing the HARQ packet into HARQ sub-packets, and storing each HARQ sub-packet. The storage locations and storage order of each of the HARQ sub-packets are recorded for future retrieval.

Another embodiment includes a wireless subscriber. The wireless subscriber includes receiver circuitry for wirelessly receiving HARQ packets. CRC processing circuitry checks an error status of the received HARQ packets. A HARQ memory controller divides the HARQ packets into HARQ sub-packets for storage in HARQ memory. The HARQ memory controller records storage locations and a storage order of each of the HARQ sub-packets.

Other aspects and advantages of the present invention will become apparent from the following detailed description, taken in conjunction with the accompanying drawings, illustrating by way of example the principles of the invention.

DETAILED DESCRIPTION

Methods and apparatuses for managing HARQ memory are disclosed. Embodiments of the methods and apparatuses provide efficient storage of HARQ bursts that fail an error check.

Figure 1:
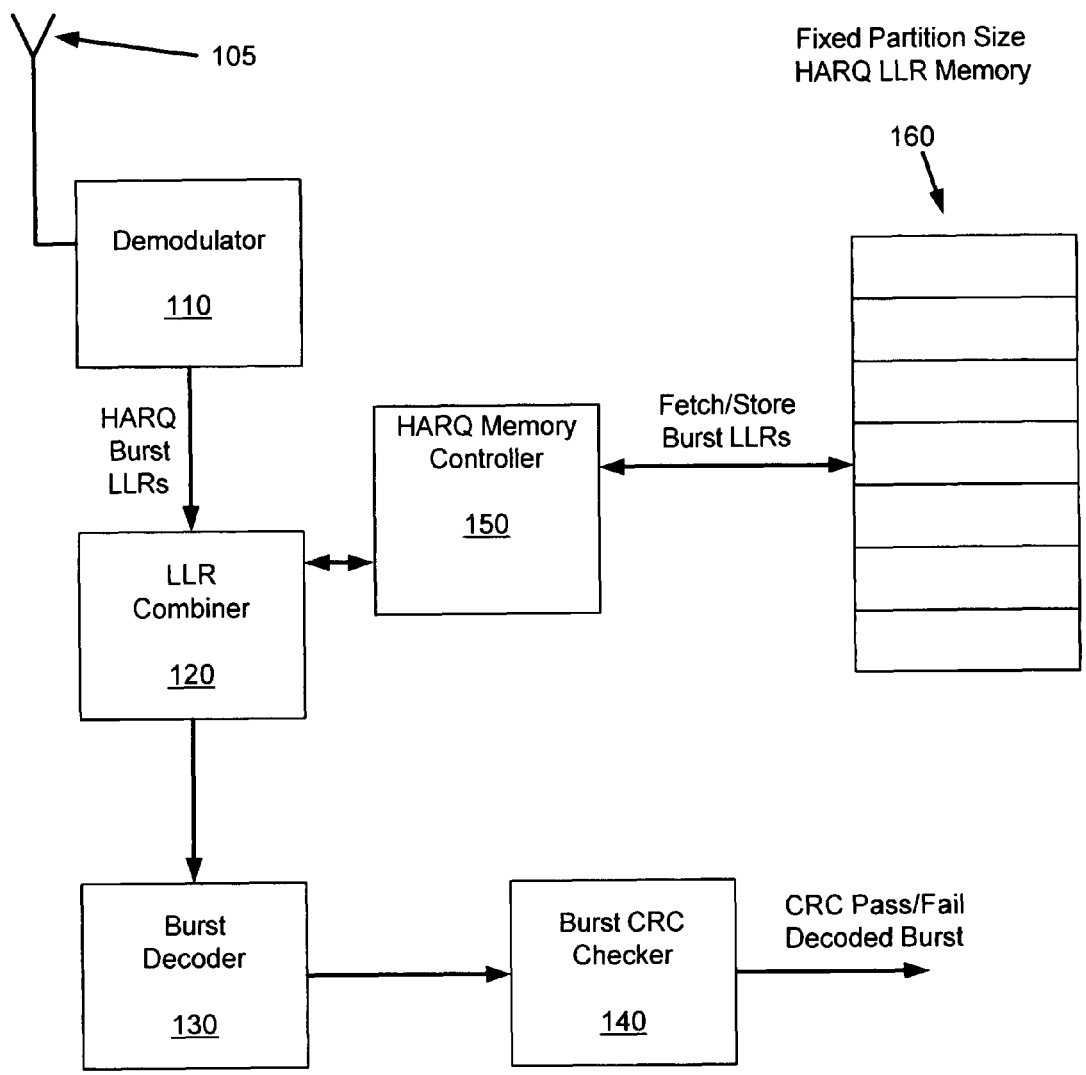
FIG. 1 shows an example of a wireless receiver system that stores HARQ packets.

FIG. 1 shows an example of a wireless receiver (generally a transceiver, for example, a WiMax subscriber) that stores HARQ packets. Transmission signals are received through a receiver antenna 105, and demodulated by demodulation electronics 110. For an embodiment, the demodulated signal includes HARQ burst log likelihood ratios (LLRs). For the description here, HARQ burst LLRs and HARQ packets may be used interchangeably. Some or all of the HARQ burst LLRs from one HARQ burst transmission may be combined with the HARQ burst LLRs for previous transmission of the same HARQ burst.

For WiMax signals, each HARQ burst is associated with a channel identifier (ACID) that identifies the burst within a WiMax frame. If a HARQ burst having a specific ACID is received for the first time, the HARQ burst LLRs are decoded by a burst decoder 130. For one embodiment, the HARQ burst LLRs are also stored in HARQ memory 160. The decoded HARQ burst LLRs are then checked for errors by a burst CRC checker 140. If the HARQ burst LLRs pass the CRC, then the decoded burst is considered successfully received. The decoded data is passed to the next element of the receiver.

If the HARQ burst LLRs fails the CRC check, the HARQ burst LLRs are stored in the fixed partition HARQ LLR memory 160. An alternate embodiment includes all HARQ burst LLRs being stored before the CRC check. As previously described, the receiver stores the entire or portions of the erroneous packet (HARQ burst LLRs) because the erroneous packet may still contain worthwhile information, and therefore is not discarded. An automatic repeat request is sent upon detection of an error, and another HARQ burst having the same ACID is resent. Upon receiving the subsequent HARQ burst, the decoding process is repeated, however, the HARQ memory controller fetches the previous HARQ burst LLRs which are combined with the new HARQ burst LLRs by the LLR combiner 120. After being combined, the burst is again decoded and the CRC checked. If the combined HARQ burst LLRs pass the CRC check, the decoded burst is passed on. If the CRC fails, the combined HARQ burst LLRs can be stored in the fixed partition HARQ LLR memory 160. Alternate embodiments include storing either the first transmitted HARQ burst LLRs or the last transmitted HARQ burst LLRs.

If system uses a fixed size HARQ burst, then the HARQ burst storage can be made efficient. The management of the memory is simple, and HARQ burst LLRs can be stored and restored efficiently. That is, memory is typically not wasted when storing HARQ burst LLRs because the HARQ burst LLRs are consistently the same (at least the size is capped) size, and the partition size of the HARQ LLR memory 160 aligns (matches) the size of the HARQ burst LLRs.

Figure 2:
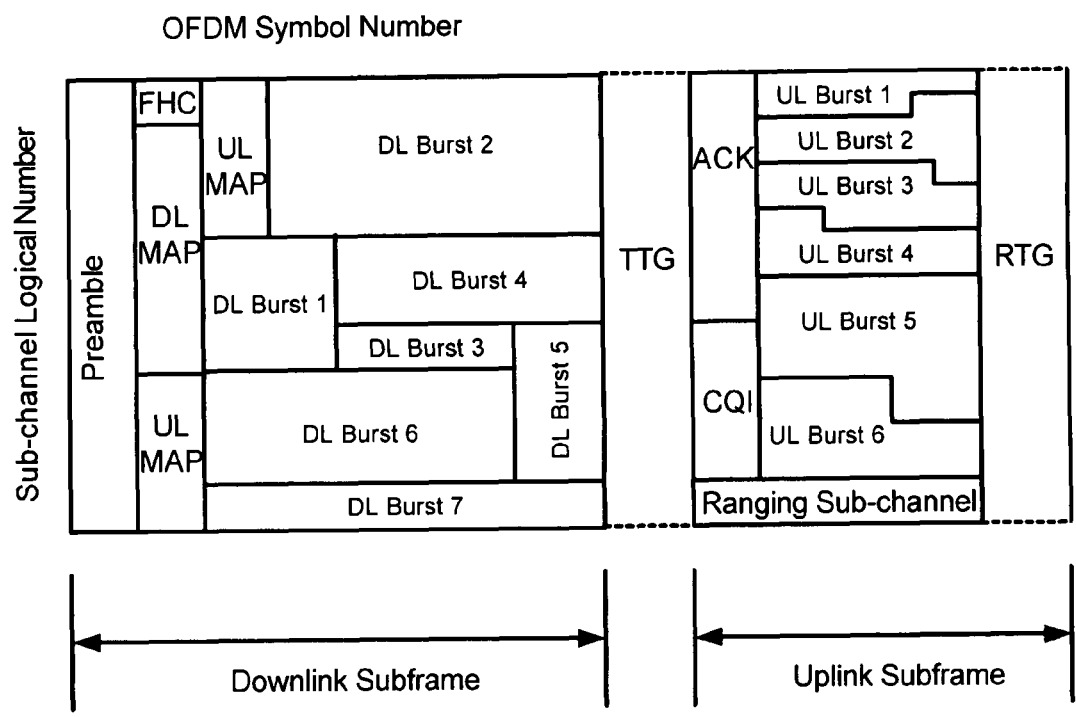
FIG. 2 shows a WiMax downlink and uplink frames that includes variable sized data bursts that contain the HARQ packets.

FIG. 2 shows a typical WiMax downlink and uplink frames that includes variable sized data bursts that include the HARQ packets (HARQ burst LLRs). That is, for example, the DL burst 2 is substantially larger than the DL3 of the downlink. Due to the variable size of the HARQ burst LLRs, the HARQ memory can become inefficient. That is, the HARQ memory required to be allocated for each of the HARQ packets varies substantially between HARQ burst LLRs. Therefore, the HARQ memory becomes fractured and inefficient when storing and restoring the HARQ burst LLRs.

Aggregation mode is a WiMax mode in which memory resources for all HARQ channels are shared. For WiMax (802.16), downlink/uplink buffering capability indicates the maximal number of data bits the subscriber is able to store for downlink/uplink HARQ. The buffering capability is indicated by two parameters. The first parameter is the number of bits per channel which indicates the total number of data bits that the subscriber can buffer per HARQ channel. The second parameter is the aggregation flag. When this flag is clear, the number of bits is counted separately for each channel, so each burst is limited to the number of bits per channel parameter. When the flag is set, buffering capability may be shared between channels, so the sum of sizes of all burst is limited to the number of bits per channel times the number of channels. This allows some burst to be bigger than the number of bits per channel parameter, while other bursts are smaller. This gives the system much greater flexibility to schedule and size the HARQ bursts.

Figure 3:
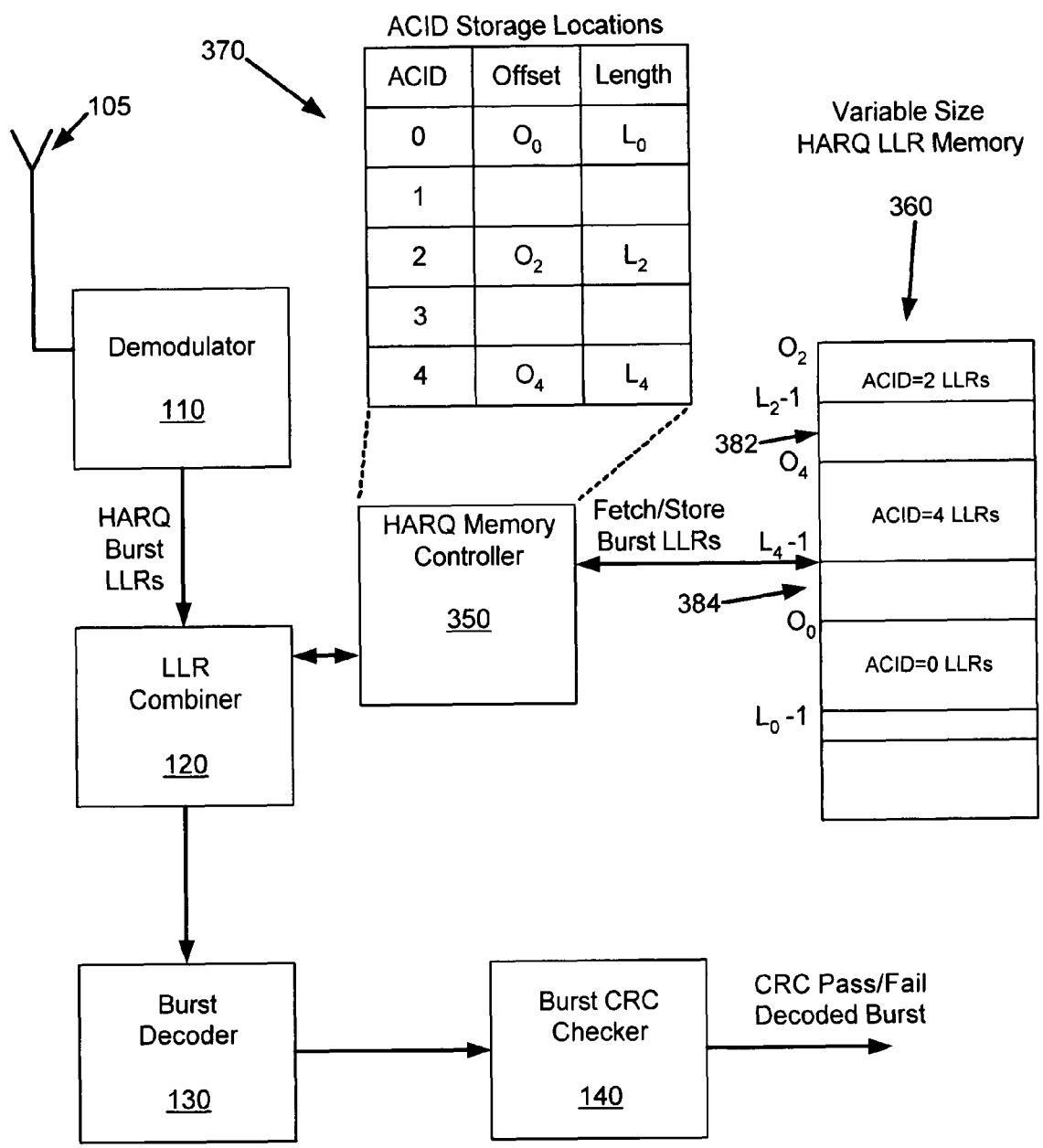
FIG. 3 shows an example of a wireless receiver system that stores variable size HARQ packets while operating in an aggregation mode.

FIG. 3 shows an example of a wireless receiver system that stores HARQ packets while operating in an aggregation mode. The sizes of the HARQ burst LLRs (packets) of this receiver are not constrained like they are with the receiver of FIG. 1. As a result, the HARQ memory 360 is used less efficiently. Tracking or monitoring the storage locations of the HARQ burst LLRs within the HARQ memory controller 350 is more complex because the size of the HARQ burst LLRs can vary rather than being fixed. Generally, a storage location table 370 of the HARQ memory controller 350 includes a location (offset) and a length of each of the stored HARQ burst LLRs. For example, a HARQ burst having an ACID of 0 is shown having an offset of $O_0$ and a length $L_0$. A HARQ burst having an ACID of 1 is shown having an offset of $O_1$ and a length $L_1$, and a HARQ burst having an ACID of 2 is shown having an offset of $O_2$ and a length $L_2$.

As shown in FIG. 3, the storage of the HARQ burst LLRs in the HARQ memory 360 is not efficient. That is, due to the variable size of the HARQ burst LLRs, the storage within the HARQ LLR memory becomes fractured after storing and later clearing several varying sized HARQ burst LLRs. FIG. 3 shows unused portions 382, 384 of the HARQ memory. Because of the inefficiency in using the HARQ LLR memory, such a system requires more LLR memory than one that can store the HARQ burst LLRs more efficiently. That is, with less fracturing of the LLR memory.

Figure 4:
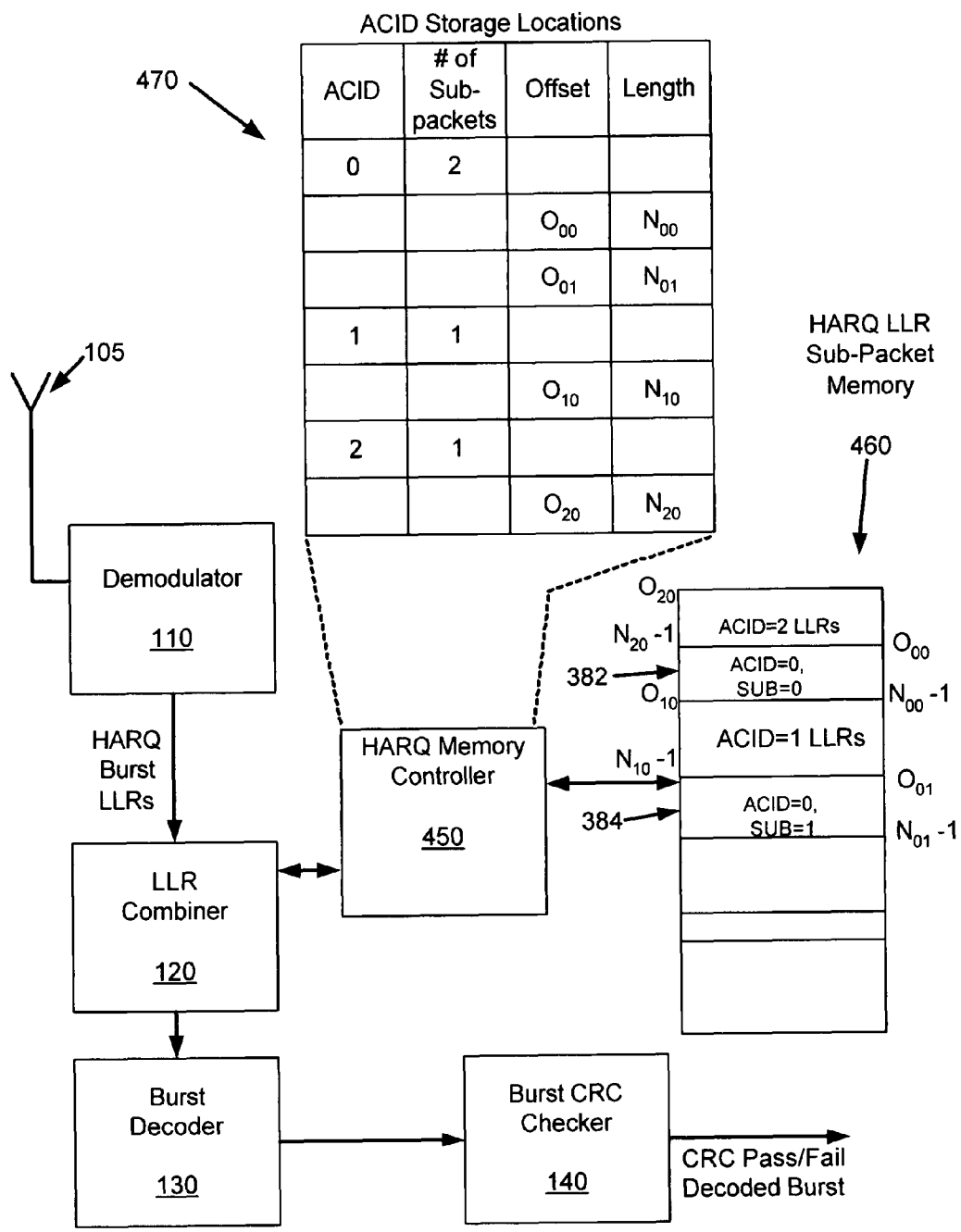
FIG. 4 shows an example of a wireless receiver system that more efficiently stores HARQ packets while operating in an aggregation mode.

FIG. 4 shows an example of an embodiment of a wireless receiver that more efficiently stores HARQ burst LLRs (HARQ packets) while operating in an aggregation mode. For this embodiment, the HARQ burst LLRs are divided into sub-packets. A HARQ memory controller 450 manages the storage of the sub-packets in HARQ sub-packet memory 460.

The storage locations of the sub-packets can be recorded as depicted by the ACID storage location table 470. That is, the locations of the sub-packets can be recorded for future reference when fetching and reconstructing a HARQ burst LLR. For example, a HARQ burst LLR having an ACID of 0, can be divided into two sub-packets. Due to their reduced size, the sub-packets can be stored in what would otherwise be unusable HARQ memory fragments (such as portions 382, 384). As shown, the sub-packets are stored at locations $O_{00}$ and $O_{01}$ having lengths of $N_{00}$ and $N_{01}$. As shown, the HARQ burst LLRs having ACIDs of 1 and 2 are not divided, and have HARQ memory locations of $O_{10}$, $O_{20}$, and have lengths of $N_{10}$, $N_{20}$.

The size of the sub-packets can be controlled, allowing the storage of the sub-packets to be substantially more efficient than storage of un-divided packets. Storing and retrieving of the sub-packets reduces the amount of fragmented, unusable HARQ memory.

The efficiency gained by generating sub-packets can be realized for both chase combining and incremental redundancy (IR) methods of HARQ transmission.

Figure 5:
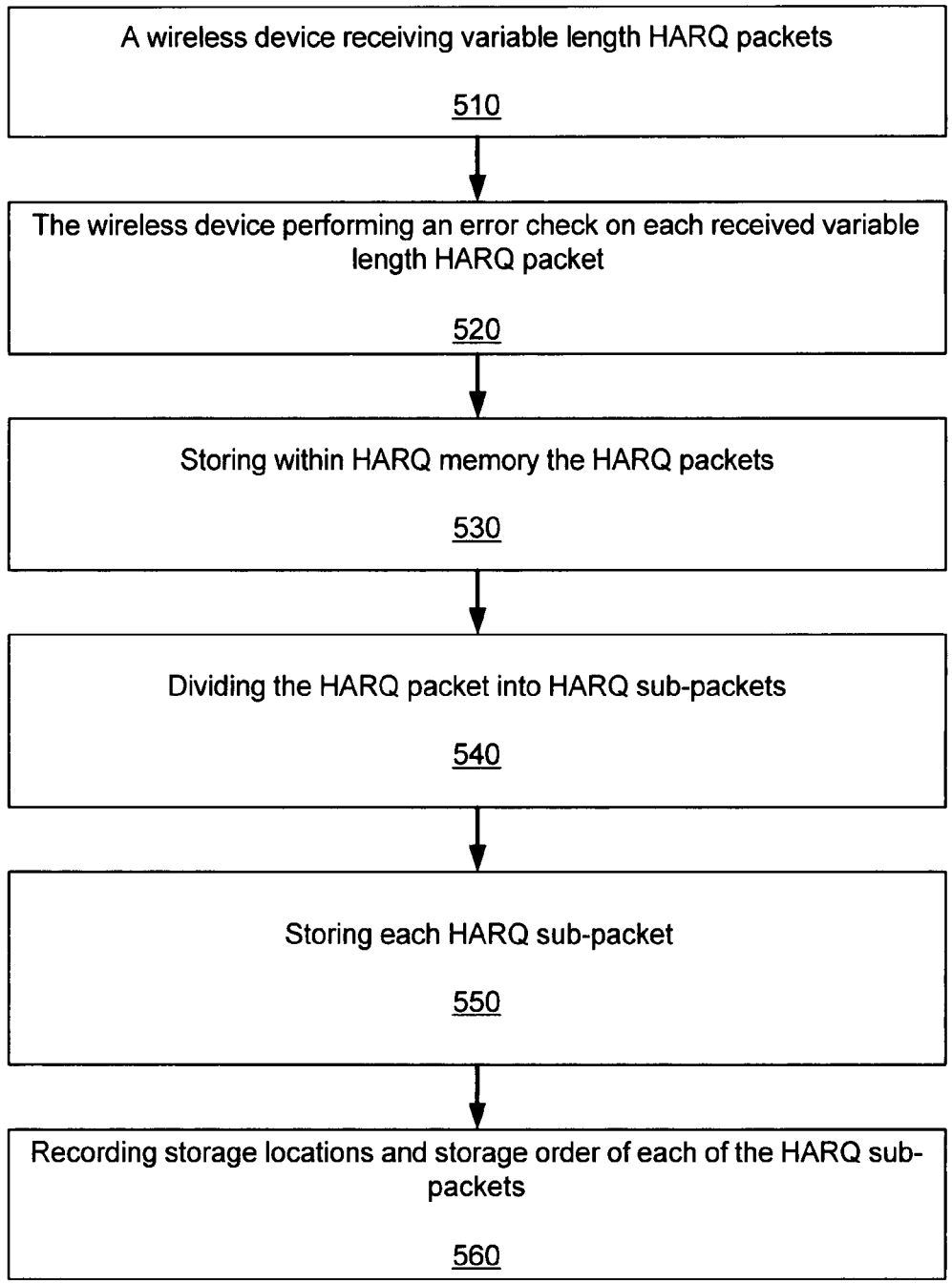
FIG. 5 is a flow chart that includes steps of one example of a method of managing storage of HARQ packets.

FIG. 5 is a flow chart that includes steps of one example of a method of managing storage of HARQ packets. A first step 510 includes a wireless device receiving variable length HARQ packets. A second step 520 includes the wireless device performing an error check on each received variable length HARQ packet. A third step 530 includes storing the HARQ packets in HARQ memory. The storing each HARQ packet includes a fourth step 540 that includes dividing the HARQ packet into HARQ sub-packets, a fifth step 550 that includes storing each HARQ sub-packet, and a sixth step 560 that includes recording storage locations and storage order of each of the HARQ sub-packets.

For one embodiment, all of the HARQ packets are stored in HARQ memory. For another embodiment, only HARQ packets that fail the error check are stored in HARQ memory.

If a HARQ packet having a given ACID is being received for the first time, the error check is performed on the HARQ packet. However, if a HARQ packet having the same channel identification (ACID) was previously stored in HARQ memory, then the error check can be performed on the received variable length HARQ packet after combining the received variable length HARQ packet with the previously received variable length HARQ packet having the same ACID.

Fetching the HARQ packets from the HARQ memory includes accessing HARQ packets stored in the HARQ memory based on the storage locations and the storage order of the HARQ sub-packets. After accessing the HARQ packets stored in the HARQ memory the corresponding HARQ sub-packets are appended to form HARQ packets in the same order as originally received.

As previously mentioned, dividing the HARQ packets into sub-packets allows for the HARQ memory to be more efficient. As a result, the HARQ memory can be reduced in size. An embodiment includes taking advantage of he reduction in the size of the HARQ memory, and forming the HARQ memory and the receiver circuitry on a common integrated circuit.

The sub-packets can be controlled so that the HARQ sub-packets each include a number of bits that corresponds with a predetermined block size of the HARQ memory. That is, based on the size of the available HARQ memory, the size of the HARQ sub-packets can be controlled to provide a desired efficiency in the use of the HARQ memory. For example, the HARQ sub-packets can be stored in non-continuous memory block locations of the HARQ memory, allowing the HARQ sub-packets to be stored using less complex memory management.

Figure 6:
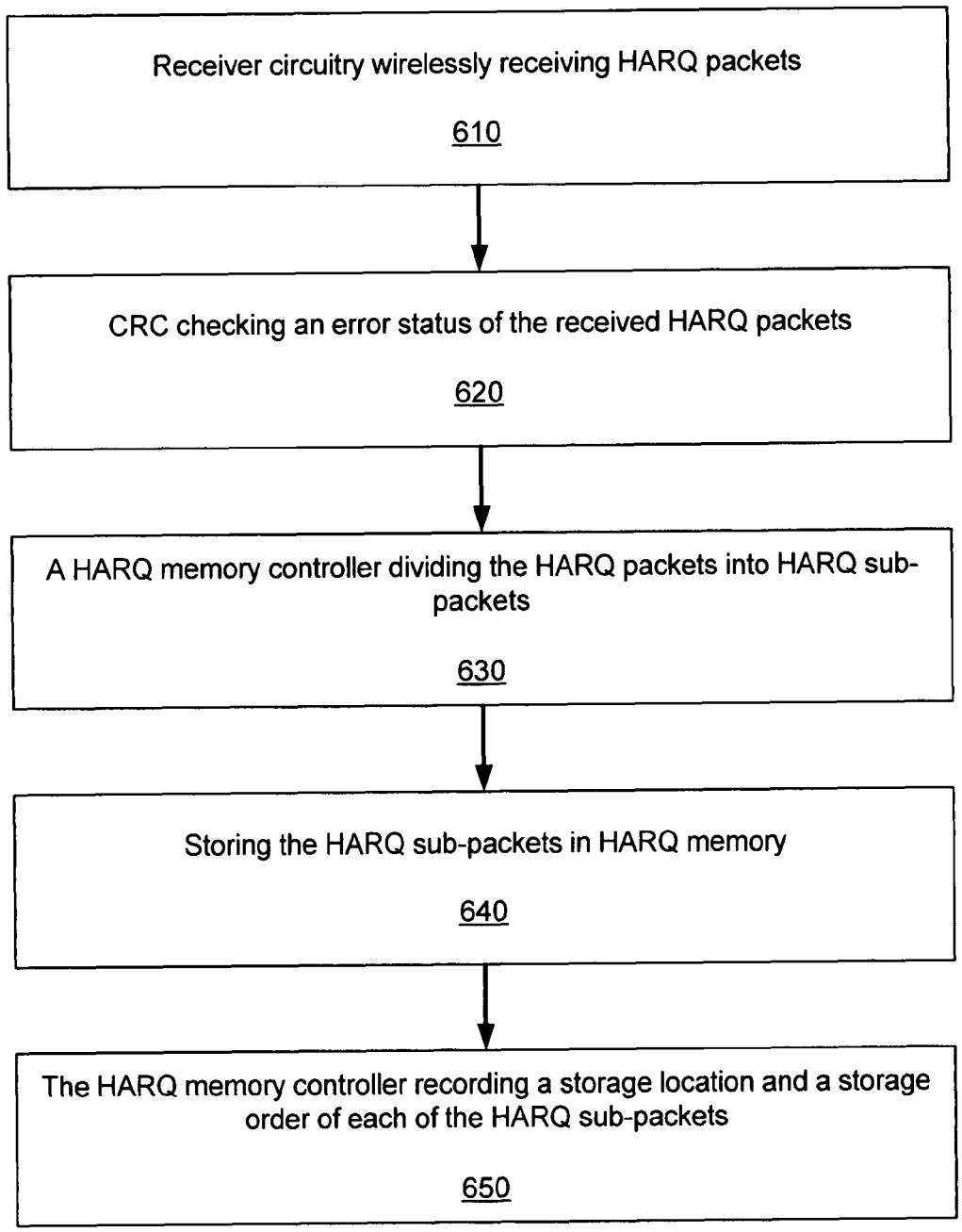
FIG. 6 is a flow chart that shows an example of steps of a method of a WiMax subscriber controlling storage of HARQ memory of the WiMax subscriber.

FIG. 6 is a flow chart that shows an example of steps of a method of a WiMax subscriber controlling storage of HARQ memory of the WiMax subscriber. A first step 610 includes receiver circuitry of the WiMax subscriber receiving HARQ packets. A second step 620 includes CRC checking the received HARQ packets. A third step 630 includes a HARQ memory controller dividing the HARQ packets into HARQ sub-packets. A fourth step 640 includes storing the HARQ sub-packets in HARQ memory. A fifth step 650 includes the HARQ memory controller recording a storage location and a storage order of each of the HARQ sub-packets for future retrieval and recombination.

As previously described, the WiMax subscriber supports a WiMax aggregation mode. The HARQ packets having variable size can be efficiently stored in HARQ memory because the HARQ packets are divided into HARQ sub-packets.

Although specific embodiments of the invention have been described and illustrated, the invention is not to be limited to the specific forms or arrangements of parts so described and illustrated. The invention is limited only by the appended claims.

What is claimed:

1. A method of managing storage of HARQ packets, comprising:
    a wireless device receiving variable length HARQ packets;
    the wireless device performing an error check on each received variable length HARQ packet; and
    storing within HARQ memory the HARQ packets;
    wherein storing each HARQ packet comprises;
        dividing the HARQ packet into HARQ sub-packets;
        storing each HARQ sub-packet;
        recording storage locations and storage order of each of the HARQ sub-packets.

2. The method of claim 1, further comprising the wireless device only storing HARQ packets within the HARQ memory that fail the error check.

3. The method of claim 1, wherein the error check is performed on each received variable length HARQ packet after combining the received variable length HARQ packet with a previously received variable length HARQ packet having a same channel identification.

4. The method of claim 1, further comprising accessing HARQ packets stored in the HARQ memory based on the storage locations and the storage order of the HARQ sub-packets.

5. The method of claim 4, wherein accessing the HARQ packets stored in the HARQ memory further comprises appending corresponding HARQ sub-packets to form HARQ packets as originally stored.

6. The method of claim 1, wherein the HARQ memory and receiver circuitry are located on a common integrated circuit.

7. The method of claim 1, wherein the HARQ sub-packets each include a number of bits that corresponds with a predetermined block size of the HARQ memory.

8. The method of claim 1, wherein the HARQ sub-packets are stored in non-continuous memory block locations of the HARQ memory.

9. The method of claim 1, wherein the error check is a CRC error check of each of the HARQ packets.

10. The method of claim 1, wherein the wireless device comprises a subscriber unit that supports a WiMax aggregation mode.

* * * * *